United States Patent
Zhao

(10) Patent No.: US 6,718,397 B1
(45) Date of Patent: Apr. 6, 2004

(54) NETWORK ADAPTER FOR PROVIDING INITIALIZATION AND PROTOCOL TRANSLATION BETWEEN A MICROPROCESSOR AND A NETWORK INTERFACE

(76) Inventor: Yijun Zhao, 70 Luo Yu Road, Wuhan, Hubei (CN), 430070

( * ) Notice: Subject to any disclaimer, the term of this patent is extended or adjusted under 35 U.S.C. 154(b) by 0 days.

(21) Appl. No.: 09/477,995

(22) Filed: Jan. 5, 2000

(51) Int. Cl.[7] ............................................. G06F 13/00
(52) U.S. Cl. ...................... 709/250; 709/236; 370/466; 370/467
(58) Field of Search ................................ 709/235–236, 709/250; 370/463, 464, 466, 467; 455/432

(56) References Cited

U.S. PATENT DOCUMENTS

| | | | |
|---|---|---|---|
| 4,200,930 A | * 4/1980 | Rawlings et al. | 709/212 |
| 4,210,780 A | 7/1980 | Hopkins et al. | |
| 4,908,823 A | * 3/1990 | Haagens et al. | 370/464 |
| 4,979,169 A | 12/1990 | Almond et al. | 370/466 |
| 5,239,662 A | 8/1993 | Danielson et al. | 709/246 |
| 5,289,469 A | 2/1994 | Tanaka | 370/469 |
| 5,321,819 A | * 6/1994 | Szczepanek | 709/228 |
| 5,323,393 A | 6/1994 | Barrett et al. | |
| 5,576,702 A | * 11/1996 | Samoylenko | 340/825.5 |
| 5,608,720 A | 3/1997 | Biegel et al. | 370/249 |
| 5,657,448 A | 8/1997 | Wadsworth et al. | 709/220 |
| 5,717,932 A | * 2/1998 | Szczepanek et al. | 710/260 |
| 5,768,613 A | 6/1998 | Asghar | 712/35 |
| 5,778,189 A | 7/1998 | Kimura et al. | 709/236 |
| 5,809,519 A | 9/1998 | Lee | 711/115 |
| 5,905,874 A | * 5/1999 | Johnson | 709/250 |
| 5,905,906 A | 5/1999 | Coffinet et al. | 710/8 |
| 5,960,344 A | * 9/1999 | Mahany | 455/432 |
| 5,982,459 A | 11/1999 | Fandrianto et al. | 348/425.3 |
| 5,991,795 A | 11/1999 | Howard et al. | |
| 6,014,705 A | 1/2000 | Koenck et al. | 709/230 |
| 6,272,551 B1 | * 8/2001 | Martin et al. | 709/250 |

OTHER PUBLICATIONS

Texas Instrument Inc. Data Sheet: "TMS380C26 Network Commprocessor", pp. 1–30, 1993.*

"Scalable Coherent Interface: Links to the Future", Gustavson, et al., Stanford Linear Accelerator Center, 1992, pp. 322–327.

"WebChipServer User's Manual", P&S DataCom Corporation, Sep. 2001.

"WebChip Technology White Paper", P&S DataCom Corporation, 2001.

* cited by examiner

*Primary Examiner*—Wen-Tai Lin
(74) *Attorney, Agent, or Firm*—Schmeiser, Olsen & Watts LLP

(57) ABSTRACT

A network adapter (20) functioning as an intermediary between a microprocessor (25) and a network (15) includes a communication protocol (43) compatible with a network protocol and an interpreter (45) compatible with a programming language of the microprocessor (25). The network adapter (20) reformats a signal received from a network interface (12) and following the network protocol into a signal compatible with the microprocessor programming language and transmits the reformatted signal to the microprocessor (25). The network adapter (20) also transforms a signal received from the microprocessor (25) into a signal compatible with the network protocol and transmits the transformed signal to the network interface (12). The network adapter (20) is capable of establishing a network communication for various kinds of microprocessors without significantly modifying or reprogramming the microprocessors.

16 Claims, 1 Drawing Sheet

NETWORK ADAPTER FOR PROVIDING INITIALIZATION AND PROTOCOL TRANSLATION BETWEEN A MICROPROCESSOR AND A NETWORK INTERFACE

FIELD OF THE INVENTION

The present invention relates, in general, to network communication and, more particularly, to establishing communication between a microprocessor and a network.

BACKGROUND OF THE INVENTION

Electronic devices are widely used in various aspects of daily life. Many electronic devices, such as those found in mobile telephones, automobiles, vending machines, utility meters, security systems, medical monitoring systems, etc., include microprocessors such as, for example, embedded microcontroller units (MCUs) for performing different functions and processes. It is often desirable to connect the MCU in an electronic device to a network such as Internet, so that the operation of the electronic device can be remotely monitored and/or controlled.

One approach for connecting a microprocessor such as an MCU to a network is to program a network protocol, e.g., Transmission Control Protocol/Internet Protocol (TCP/IP), into the MCU. An MCU with TCP/IP programmed therein can access Internet through a modulation and demodulation device (MODEM). This approach normally needs an MCU of at least 16 bits. It also needs a large memory, e.g., at least 32 kilo-bytes, and a high operating speed in order to achieve a satisfactory performance. Furthermore, the engineers who program the MCU chip must be familiar not only with the applications of the MCU but also with the TCP/IP protocol and related interfaces. Therefore, this approach usually requires a long development period, a high performance chip, and is cost inefficient.

Another approach for connecting a microprocessor such as an MCU to a network is to establish a network interface, e.g., an interface developed by emWare, Inc. under the trademark "emGateway", off chip and program a network interface compatible protocol, e.g., a protocol developed by emWare, Inc. under the trademark "emNet", into the MCU chip. An MCU with emnet programmed therein can access Internet via the network interface emGateway. Although emNet requires less memory than TCP/IP, this approach still requires the design engineers to be familiar not only with the application of the MCU but also with the emNet and related interfaces. Furthermore, the existing MCU chips in a user's application systems may not satisfy the designer's expectation because of chip capability, memory, speed, etc. Therefore, this approach often also requires a long development period, a relatively high performance chip, and is cost inefficient.

Accordingly, it would be advantageous to have a cost efficient method for communicating between a microprocessor and a network. It is desirable for the method to be simple and reliable. It is also desirable for the method to be compatible with different types of microprocessors in terms of capabilities, performances, costs, etc. It is especially desirable for the method to be compatible with a user's existing microprocessor chips. It would be of further advantage to have a simple, reliable, and cost efficient apparatus to implement the method.

SUMMARY OF THE INVENTION

A prime advantage of the present invention is to provide a simple and cost efficient process for communicating between a microprocessor and a network. Another advantage of the present invention is to provide a simple, reliable, and cost efficient apparatus to implement the communication process. A further advantage of the present invention is to provide the communication process capable of establishing communications between the network and microprocessors with wide spectra of applications, capabilities, performances, bit numbers, memory sizes, etc. In addition, a particular advantage of the present invention is that the communication process can be readily implemented with an existing microprocessor chip.

In order to achieve these and other advantages of the present invention, a method for communicating between a microprocessor and a network is implemented by first coupling the microprocessor to a signal adapter. The signal adapter includes a signal processing unit and a memory unit coupled to the signal processing unit. A communication protocol is stored in the memory unit. The signal adapter also has an interpreter stored in the memory unit. The interpreter is compatible with the programming language, e.g., C, C++, an assembly language, etc., of the microprocessor. The signal adapter functions as an intermediary between the network and the microprocessor.

A signal in the network typically follows a network protocol. For example, a signal in the Internet typically follows Transmission Control Protocol/Internet Protocol (TCP/IP). Preferably, a signal in the network is sent to the microprocessor through a network interface and the signal adapter. The network interface, such as an interface developed by emWare, Inc. under the trademark "emGateway", coverts the signal from TCP/IP to a network protocol, such as a protocol developed by emWare, Inc. under the trademark "emNet", compatible with the communication protocol on the signal adapter. The signal adapter identifies, interprets, and reformats the signal received from the network interface into a microprocessor acceptable signal, e.g., a signal in a format compatible with C, C++, an assembly language, etc. Depending on the signal, the signal adapter can execute the reformatted signal and/or send the reformatted signal to the microprocessor. The signal adapter can also ignore the reformatted signal.

Depending on the signal received from the signal adapter, the microprocessor can either execute or ignore the received signal. If the execution of the signal by the microprocessor requires the microprocessor to send a return signal back to the network, the return signal is sent to the signal adapter according to a format acceptable to the signal adapter. The signal adapter identifies, interprets, and reformats the return signal in accordance with the communication protocol and sends it to the network interface. The network interface converts the signal into the network protocol sends it to the network.

The signal adapter of the present invention can establish communications between networks and microprocessors of various capabilities, performances, bit numbers, and memory sizes. It is compatible with microprocessors having as little as four bits. It does not occupy memories on the microprocessor. It does not require significant modifications of the programming structure or the physical structure of existing microprocessors in a user's application systems. The designers of the microprocessors are not required to be familiar with the network protocol. By communicating with a network, e.g., Internet, via a network interface, e.g., emGateway, the communication protocol on the signal adapter can be simple and memory space efficient. Therefore, the signal adapter of the present invention is simple, reliable, and cost efficient.

DETAILED DESCRIPTION OF THE PREFERRED EMBODIMENTS

Figure 1:
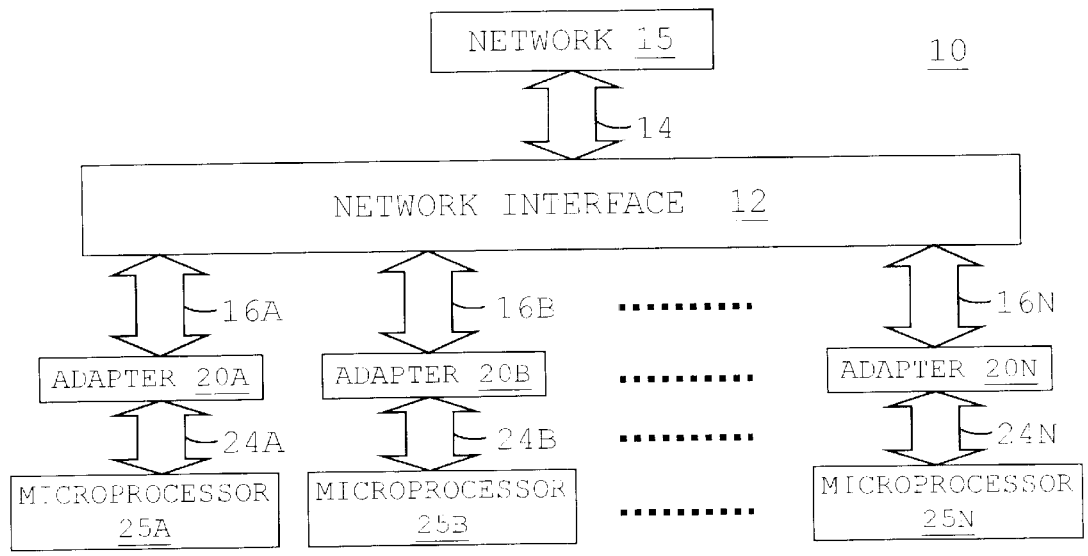
FIG. 1 is a block diagram illustrating a microprocessor-network communication system in accordance with the present invention.

Various embodiments of the present invention are described herein below with reference to the figures, in which elements having similar functions are labeled using the same or related reference numerals in the figures. It should be understood that the scope of the present invention is not limited to those embodiments shown in the figures and described herein below.

FIG. 1 is a block diagram illustrating a microprocessor-network communication system 10 in accordance with the present invention. By way of example, FIG. 1 shows communication system 10 between a network 15 and a plurality of microprocessors 25A, 25B, . . . , and 25N. In accordance with the present invention, communication system 10 is capable of establishing the communications between network 15 and any number of microprocessors, e.g., one, two, three, four, and so on. Microprocessors 25A–25N include any kinds of processing units such as, for example, signal processing units, central processing units (CPUs), micro controller units (MCUs), etc. Microprocessors 25A–25N can be coupled to various kinds of electronic systems (not shown) such as, for example, utility meters, refrigeration systems, home security systems, medical monitoring systems, vending machines, navigation systems, etc. for monitoring and/or controlling the operations of those electronic systems.

Communication system 10 establishes communications between network 15 and microprocessors 25A–25N through a network interface 12 and a plurality of signal adapters 20A, 20B, . . . , and 20N. Signal adapter 20A is coupled to microprocessor 25A via a signal transmission line 24A. Likewise, signal adapter 20B is coupled to microprocessor 25B via a signal transmission line 24B, and signal adapter 20N is coupled to microprocessor 25N via a signal transmission line 24N. Signal adapters 20A–20N establish communications between network interface 12 and respective microprocessors 25A–25N. In a preferred embodiment, each of signal adapters 20A–20N and corresponding microprocessors 25A–25N are located adjacent to each other and close to respective electronic systems (not shown) coupled to corresponding microprocessors 25A–25N.

By way of example, FIG. 1 shows network interface 12 being coupled to network 15 via a signal transmission line 14 and coupled to signal adapters 20A, 20B, . . . , and 20N via corresponding signal transmission lines 16A, 16B, . . . , and 16N. This is not intended as limitations of the present invention. In a preferred embodiment, network 15, e.g., an Internet browser with TCP/IP, and network interface 12, e.g., an emGateway interface, are installed in a single system, e.g., a personal computer. Alternatively, the communications between network interface 12 and network 15 can be either wired or wireless. Likewise, the communications between network interface 12 and signal adapters 20A–20N can also be either wired or wireless. Examples of wireless communication include radio frequency (RF) communication and infrared communication following an Infrared Data Association (IrDA) protocol. Wired communication can be either serial or parallel signal transmissions. The serial signal transmissions, such as asynchronous data transmissions following the RS-232 or RS-485 serial communication standard published by the Electronic Industries Alliance (EIA), are typically more cost efficient and more reliable than parallel signal transmissions. However, the parallel signal transmissions are usually faster than the serial signal transmissions.

Figure 2:
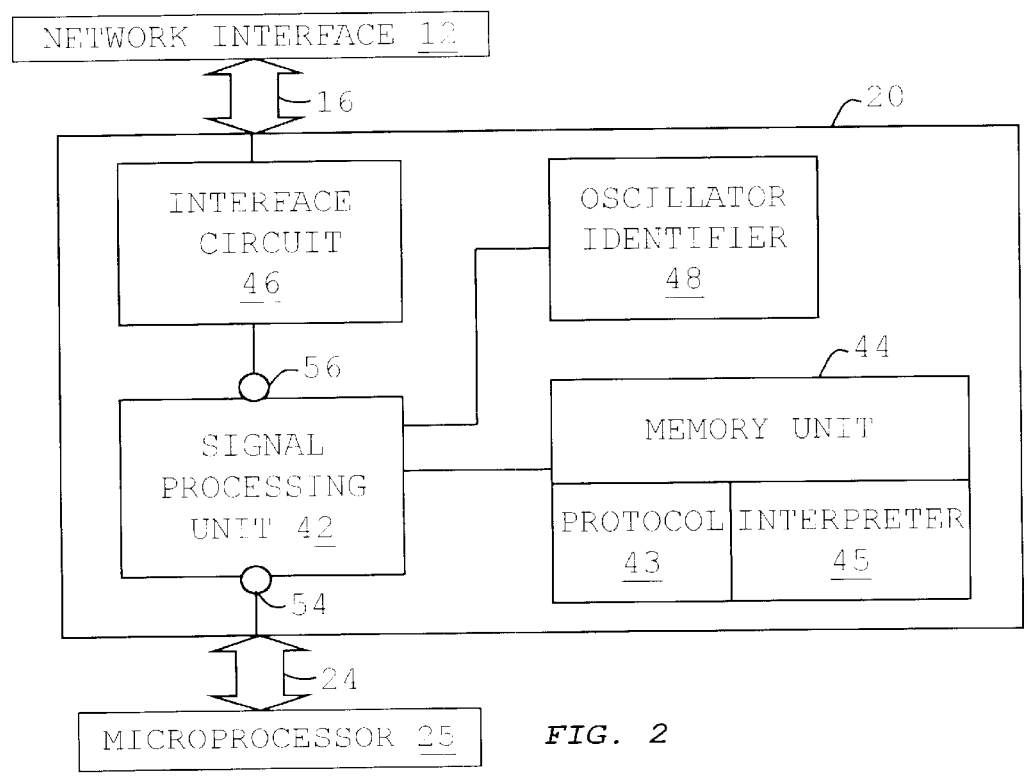
FIG. 2 is a block diagram illustrating a signal adapter in accordance with the present invention.

FIG. 2 is a block diagram of an adapter 20 coupled between a network interface 12 and a microprocessor 25 in accordance with the present invention. Adapter 20 can be any of signal adapters 20A–20N shown in FIG. 1. Microprocessor 25 can be any of microprocessors 25A–25N shown in FIG. 1. Adapter 20 is an apparatus for establishing a communication or providing an interface between microprocessor 25 and a network, such as network 15 shown in FIG. 1. Adapter 20 transforms a signal received from network interface 12 and following a network protocol to a signal in a protocol compatible with the programming language of microprocessor 25. Adapter 20 also transforms a signal received from microprocessor 25 and following the protocol compatible with the programming language of microprocessor 25 to a signal in the network protocol. Therefore, adapter 20 can also be referred to as a signal adapter, a network adapter, a network connector, an interface, a signal conversion device, a data conversion device, a network connecting device, a network connectivity device, a network interface, etc.

Adapter 20 includes a signal processing unit 42 and a memory unit 44 coupled to signal processing unit 42. Preferably, memory unit 44 is a nonvolatile memory unit, e.g., a read only memory (ROM), an electrically erasable and programmable read only memory (EEPROM), and the likes. Signal processing unit 42 can be a microprocessor, an MCU, a CPU, or the likes. Typically, adapter 20 also includes a volatile memory unit (not shown), e.g., a static random access memory (SRAM) or a dynamic random access memory (DRAM) unit coupled to signal processing unit 42. A communication protocol 43 and an interpreter 45 are established in adapter 20. By way of example, communication protocol 43 and interpreter 45 are stored in memory unit 44. Communication protocol 43 is preferably compatible with a network protocol, e.g., emNet, of network interface 12. Interpreter 45 is preferably compatible with a programming language, e.g., C, C++, assembly language, etc., of microprocessor 25.

Adapter 20 has terminals 54 and 56 connected to signal processing unit 42. Terminal 54 is adapted for coupling to microprocessor 25 via a signal transmission line 24. Signal transmission line 24 can be a serial signal transmission line 10 or a parallel signal transmission line. In a preferred embodiment, signal transmission line 24 includes a three-wire serial synchronous communication protocol referred to as serial peripheral interface (SPI) and developed by Motorola, Inc. Terminal 56 is adapted for transmitting signals between signal processing unit 42 and network interface 12. The signal transmissions between signal processing unit 42 and network interface 12 can be either wired or wireless and may follow any industry standards or protocols such as those described herein above with reference to FIG. 1. An interface circuit 46 in adapter 20 is connected to terminal 56 and functions to conform signal to predetermined standards and protocols. Adapter 20 further includes an oscillator and identifier circuit 48 coupled to signal processing unit 42. The oscillator provides a clock signal to signal processing unit 42. The identifier provides an electronic identification to adapter 20, thereby enabling network interface 12 to selectively communicate with any of microprocessors 25A–25N via respective signal adapters 20A–20N as shown in FIG. 1.

In a preferred embodiment, signal processing unit 42 and memory unit 44 are fabricated on a single semiconductor chip. Interface circuit 46 and oscillator and identifier circuit 48 can be either fabricated on the same chip as signal processing unit 42 and memory unit 44 or fabricated on different chips. Preferable, signal processing unit 42, memory unit 44, interface circuit 46, and oscillator and identifier circuit 48 are packaged together as a single integrated circuit (IC) device 20. However, this is not a limitation of the present invention. In accordance with the present invention, different components in adapter 20 can be fabricated on a single chip or on different chips and can be packaged into a signal device or packaged into several devices. Further, adapter 20 is not limited to being an IC device. It is also conceivable for adapter 20 to be comprised of discrete devices.

In operation, when adapter 20 is switched on, it is initially disconnected from network interface 12. Adapter 20 sends a signal to microprocessor 25 requesting initialization. Microprocessor 25 responds by transmitting an initialization signal to adapter 20. Adapter 20 sets up the connection with network interface 12 in accordance with the initialization signal. If adapter 20 does not receive the initialization signal from microprocessor 25 within a predetermined time interval, it will use a default initial state to establish the connection with network interface 12. After establishing the connection with network interface 12, adapter 20 generates a signal informing microprocessor 25 about the connective state between adapter 20 and network interface 12.

The communications among microprocessor 25, adapter 20, and network interface 12 follow a predetermined protocol. In a preferred embodiment, network interface 12 and adapter 20 have a master-slave relationship with respect to each other, and adapter 20 and microprocessor 25 have a master-slave relationship with respect to each other. Generally, a master can initiate a process in a slave by sending a signal to the slave, and the slave sends signals back the master upon request. On the other hand, in accordance with a preferred embodiment of the present invention, microprocessor 25 can send signals to adapter 20. For example, microprocessor 25 can send a signal to adapter 20, requesting the establishment of a connection or a path of signal transmission between adapter 20 and network interface 12. Such a request signal is sometimes referred to as a wake up signal. In response to the wake up signal from microprocessor 25, adapter 20 can send a signal to network interface 12, requesting network interface 12 to recognize adapter 20 and establish the path of signal transmission or the connection between network interface 12 and adapter 20.

Network interface 12 can send command signals, data signals, and request signals to adapter 20. Upon receiving a signal from network interface 12, communication protocol 43 in adapter 20 unpacks the signal and verifies the validity of the signal. By way of example, adapter 20 can verify the validity of the signal by performing a cyclic redundancy check (CRC). Adapter 20 informs network interface 12 about any invalid signal. In accordance with communication protocol 43 and interpreter 45 stored in memory unit 44, signal processing unit 42 transforms or converts a valid signal following the network protocol into a signal in accordance with a microprocessor programming language. In other words, adapter 20 generates a signal or a data package in a protocol compatible with microprocessor 25 in response to the signal in the network protocol and received from network interface 12. More particularly, adapter 20 identifies, interprets, and reformats the signal from network interface 12 into a signal acceptable to microprocessor 25. Depending the signal, adapter 20 executes the transformed signal and/or transmits the transformed signal to microprocessor 25 via signal transmission line 24.

Microprocessor 25 executes the incoming signal or data received from adapter 20. Depending on the signal, microprocessor 25 may return a signal or data package back to network interface 12. In a preferred embodiment, microprocessor 25 can send data or return signals to adapter only after receiving permission from adapter 20. Upon receiving the permission, microprocessor 25 transmits the returned signal to adapter 20 via signal transmission line 24. Preferably, the return signal follows a predetermined format acceptable to adapter 20. In accordance with communication protocol 43 and interpreter 45 stored in memory unit 44, signal processing unit 42 transforms, converts, or reformats the return signal following the microprocessor programming language into a signal in the network protocol. In other words, adapter 20 generates a signal or a data package in a protocol compatible with the network protocol in response to the signal in the protocol compatible with microprocessor 25 and received from microprocessor 25. Following permission from network interface 12, adapter 20 transmits the transformed signal to network interface 12 through interface circuit 46. Depending on its size, a signal or data transmitted between network interface 12, adapter 20, and microprocessor 25 can be transmitted in a single data packet or in a plurality of data packets.

As mentioned herein above, adapter 20 sends a signal to microprocessor 25 requesting initialization when adapter 20 is switched on. Adapter 20 may also send request signals to microprocessor 25 in other events or situations. For example, adapter 20 may send signals to microprocessor 25 to request instructions from microprocessor 25 regarding the connection or disconnection between adapter 20 and network interface 12. In addition, adapter 20 may send signals to microprocessor 25 for sending data to microprocessor 25 and for grant permission to microprocessor 25 to send data to adapter 20.

Microprocessor 25 can send a signal to adapter 20 to disrupt the path of signal transmission between adapter 20 and network interface 12, or disconnect adapter 20 from network interface 12. While being disconnected from network interface 12, adapter 20 is preferably in a low power consumption idle state. In accordance with a preferred embodiment of the present invention, adapter 20 in the idle state periodically sends request signals to microprocessor 25. For example, adapter 20 can generate and transmit a request signal to microprocessor 25 once in a period ranging from approximately 50 milli-seconds (ms) to approximately 800 ms. According to one preferred embodiment, adapter 20 transmits a request signal to microprocessor 25 every 200 ms. According to another preferred embodiment, adapter 20 transmits a request signal to microprocessor 25 every 500 ms. In accordance with the present invention, microprocessor 25 can either ignore the request signal or send a signal back to adapter 20 for controlling and/or adjusting the states of adapter 20, such as reconnecting adapter 20 to network interface 12, resetting adapter 20, etc.

In a preferred embodiment, the data transmitted from microprocessor 25 to network interface 12 via adapter 20 follow a format prescribed by adapter 20 and include data about capability parameters of microprocessor 25 and data describing variables stored in microprocessor 25. More particularly, information communicated between microprocessor 25 and network interface 12 are preferably based on a capability table and a variable table programmed in microprocessor 25. The capability table informs network interface 12 the capability parameters of microprocessor 25, such as the number of variables in the variable table, the bytes occupied by the variable table, the bytes of nonvolatile memory the expression formats of the character strings, etc. The variable table preferably lists all information needed for the communication between microprocessor 25 and network interface 12. Adapter 20 preferably does not accept information not listed in the variable table.

By now it should be appreciated that a process and an adapter for establishing microprocessor-network communications have been provided. The adapter of the present invention is capable of establishing communications between networks and microprocessors without modifying the programming structure or the physical structure of existing microprocessors. The microprocessor design processes do not depend on the network protocol. The designers of the microprocessors are not required to be familiar with the network protocol. The adapter is compatible with microprocessors, MCUs, CPUs, etc., of various capabilities, performances, bit numbers, and memory sizes. Thus, the development time and cost of a microprocessor-network system in accordance with the present invention are significantly reduced compared with prior art microprocessor-network communication systems In a preferred embodiment, the adapter communicates with the network via a network interface, thereby significantly simplifying the adapter compared with prior art devices. Therefore, the adapter of the present invention is simple, reliable, and cost efficient. In addition, the communication process of the present invention can be readily implemented with microprocessors in a user's existing application systems.

What is claimed is:

1. A method for establishing communication between a microprocessor and a network, the method comprising the steps of:
   coupling a network interface to the microprocessor through a network adapter;
   initializing the network adapter by transmitting an initialization request signal from the network adapter to the microprocessor and receiving a responsive initialization signal from the microprocessor to the network adaptor, wherein the network adapter sets up a communication connection between the network adapter and the network interface in accordance with the initialization signal;
   after initialization, transmitting a first signal from the microprocessor to the network adapter in a first microprocessor compatible communication protocol;
   after initialization, transmitting a second signal in a network protocol from the network interface to the network adapter; and
   generating a third signal at the network adapter in a second microprocessor compatible communication protocol in response to the second signal.

2. The method as claimed in claim 1, wherein the step of transmitting a first signal includes transmitting the first signal to disrupt a path of signal transmission between the network adapter and the network.

3. The method as claimed in claim 1, further comprising the step of transmitting the third signal from the network adapter to the microprocessor.

4. The method as claimed in claim 1, wherein the step of transmitting a second signal includes transmitting the second signal of a type selected from the group consisting of command signals, data signals, and request signals.

5. The method as claimed in claim 1, further comprising the steps of:
   generating a fourth signal at the network adapter in the network protocol in response to the first signal; and
   transmitting the fourth signal from the network adapter to the network interface.

6. The method as claimed in claim 5, wherein the step of transmitting a first signal further includes transmitting a data signal about capability parameters of the microprocessor.

7. The method as claimed in claim 5, wherein the step of transmitting a first signal further includes transmitting a data signal describing variables stored in the microprocessor.

8. The method as claimed in claim 5, wherein the steps of transmitting a second signal and transmitting the fourth signal include transmitting signals wirelessly.

9. The method as claimed in claim 5, wherein the steps of transmitting a second signal and transmitting the fourth signal include transmitting the second signal and the fourth signal in accordance with a serial communication standard.

10. A method for establishing microprocessor-network communication, the method comprising the steps of:
    coupling a signal adapter to a microprocessor and to a network interface for a network;
    transmitting an initialization request signal from the network adapter to the microprocessor and in response transmitting an initialization signal to the signal adapter for setting up a connection between the adapter and the network interface;
    after initialization, transmitting a first signal in a first network protocol from a network interface to the signal adapter;
    transforming the first signal to a second signal in a microprocessor compatible communication protocol;
    transmitting the second signal from the signal adapter to the microprocessor;
    after initialization, transmitting a third signal in the microprocessor compatible communication protocol from the microprocessor to the signal adapter;
    transforming the third signal to a fourth signal in the first network protocol;
    transmitting the fourth signal from the signal adapter to the network interface; and
    transmitting a fifth signal from the network interface to the network in a network protocol in response to the fourth signal.

11. The method as claimed in claim 10, wherein the step of coupling a signal adapter to a microprocessor includes coupling the signal adapter to the microprocessor via a serial signal transmission line.

12. The method as claimed in claim 10, further comprising the steps of:
    coupling a second signal adapter to a second microprocessor;
    transmitting a sixth signal in the first network protocol from the network interface to the second signal adapter; and
    reformatting the sixth signal to a seventh signal in a communication protocol acceptable to the second microprocessor.

13. An apparatus for establishing a communication between a microprocessor and a network interface, the apparatus comprising:
    a signal processing unit, said signal processing unit being adapted for coupling to the microprocessor and adapted to transmit an initialization request signal to the microprocessor, to receive an initialization signal from the microprocessor in response to the initialization request signal, to set up a connection between the network adapter and the network interface in accordance with the initialization signal, and to transmit signals to and receive signals from the network interface after initialization;

a memory unit coupled to said signal processing unit;

a network compatible communication protocol established in said memory unit; and an interpreter established in said memory unit, said interpreter being compatible with the programming language of the microprocessor.

14. The apparatus of claim 13, said signal processing unit being adapted for transforming a first signal following said communication protocol and received from the network interface to a first data compatible with a microprocessor language and transforming a second data received from the microprocessor to a second signal following said communication protocol.

15. The apparatus of claim 13, said signal processing unit periodically generating request signals and transmits the request signals to the microprocessor.

16. The apparatus of claim 13, said signal processing unit being adapted for coupling to the microprocessor via a serial signal transmission line.

* * * * *